United States Patent
Marion et al.

(10) Patent No.: US 7,662,865 B2
(45) Date of Patent: Feb. 16, 2010

(54) PROCESS OF FISCHER-TROPSCH SYNTHESIS BY CONTROL OF THE PARTIAL PRESSURE OF WATER IN THE REACTION ZONE

(75) Inventors: Marie-Claire Marion, Vernaison (FR); Francois Hugues, Vernaison (FR); Magalie Roy-Auberger, Nivolas-Vermelle (FR)

(73) Assignees: Institut Francais du Petrole, Rueil Malmaison Cedex (FR); ENI S.p.A., Rome (IT)

( * ) Notice: Subject to any disclaimer, the term of this patent is extended or adjusted under 35 U.S.C. 154(b) by 0 days.

(21) Appl. No.: 12/348,044

(22) Filed: Jan. 2, 2009

(65) Prior Publication Data

US 2009/0176894 A1    Jul. 9, 2009

(30) Foreign Application Priority Data

Jan. 4, 2008    (FR) .................................. 08 00056

(51) Int. Cl.
*C07C 27/00*    (2006.01)

(52) U.S. Cl. .......... 518/715; 518/700; 518/705
(58) Field of Classification Search ............... 518/700, 518/715

See application file for complete search history.

(56) References Cited

U.S. PATENT DOCUMENTS 5,258,411 A * 11/1993 Behrmann et al. .......... 518/715

* cited by examiner

*Primary Examiner*—Jafar Parsa
(74) *Attorney, Agent, or Firm*—Millen, White, Zelano & Branigan, P.C.

(57) ABSTRACT

The subject of the invention is a process for the synthesis of hydrocarbons based on a synthesis gas type feedstock in which said synthesis gas is brought into contact with a catalyst in a reactor under Fischer-Tropsch synthesis conditions and in which the partial pressure of water is controlled in order to keep it below a critical value $ppH_2O\text{-}_{limit}$ defined by the formula: $ppH_2O_{limit}=\exp(-7751/d_p \cdot T) \cdot P_s(T)$ where T is the reaction temperature in K, $d_p$ is the average diameter of the catalyst pores in nm, determined by nitrogen adsorption-desorption (BJH method), $P_s(T)$ is the saturating water vapour pressure at temperature T, in bar.

20 Claims, No Drawings

PROCESS OF FISCHER-TROPSCH SYNTHESIS BY CONTROL OF THE PARTIAL PRESSURE OF WATER IN THE REACTION ZONE

The present invention relates to the field of the synthesis of hydrocarbons based on a synthesis gas via a stage of Fischer-Tropsch synthesis. It relates more particularly to an improved Fischer-Tropsch synthesis process making it possible to maximize the production of hydrocarbons while still minimizing the operation costs, in particular the costs inherent in catalyst consumption.

The subject of the invention is an improved process for the synthesis of hydrocarbons from synthesis gas in which the partial pressure of water in the synthesis reactor is controlled in order to keep it below a critical value $ppH_2O_{limit}$ which depends on the temperature of the reactor and the physico-chemical characteristics of the catalyst used. The invention makes it possible to increase the service life of the catalyst and limit its mechanical degradation. It is applicable quite particularly in the case of Fischer-Tropsch processes used in XTL complexes (GTL, CTL or BTL, respectively "Gas To Liquid", "Coal To Liquid" and "Biomass To Liquid").

PRIOR ART

The reaction converting synthesis gas (mixture comprising carbon monoxide, hydrogen and optionally carbon dioxide) to hydrocarbons has been known since the beginning of the twentieth century and is commonly called Fischer-Tropsch synthesis. Units were operated in Germany during the second world war, then in South Africa in order to synthesize synthetic fuels. The majority of these units, essentially dedicated to the production of synthetic fuels, were or still are operated with iron-based catalysts.

More recently, fresh interest has been shown in these syntheses, and more particularly in the use of catalysts comprising cobalt which make it possible to direct the reaction towards the formation of heavier hydrocarbons, mainly paraffinic, essentially C5+ hydrocarbons (hydrocarbons comprising 5 or more carbon atoms per molecule) while still minimizing the formation of methane and hydrocarbons having between 2 and 4 carbon atoms per molecule (C2-C4). The hydrocarbons thus formed can be converted in a downstream hydrocracking unit, in order to produce predominantly kerosene and gas oil. Such a process is for example described in the patent EP-B-1 406 988.

The use of catalysts comprising cobalt is more suitable for treating synthesis gases (feedstock) richer in hydrogen from the conversion of natural gas in particular.

Numerous cobalt-based formulations have been described in the prior art and for example in the patent applications EP-A-0 313 375 or EP-A-1 233 011. Unlike iron-based catalysts which are active in the reaction converting CO (to $CO_2$, water gas shift reaction or WGSR):

$CO+H_2O \rightarrow CO_2+H_2$, cobalt-based catalysts exhibit only very little activity for this reaction (B. H. Davis, Catalysis Today, 84, 2003, p. 83).

Consequently, depending on the operating conditions used (pressure, temperature, degree of conversion etc.), high partial pressures of water vapour can be generated during the Fischer-Tropsch reaction. These severe conditions can harm the catalyst and rapidly cause its degradation.

The effect of water on Fischer-Tropsch catalysts containing cobalt has, for example, been studied by M. Rothaemel et al. (Catalysis Today, Vol. 38, Issue 1, 1997, p. 79-84) who demonstrated a deactivation of supported catalysts with cobalt on alumina due to water. The deactivation is explained by the loss of active sites and more precisely by the oxidation of the metal cobalt at the surface.

The phenomenon of deactivation of Fischer-Tropsch catalysts by water has also been studied by P. J. van Berge et al. (Catalysis Today, Vol. 58, Issue 4, May 2000, p. 321-334). They showed by different analytical means that the phenomenon of oxidation of reduced cobalt catalysts was a function of the ratio $P_{H2}/P_{H2O}$.

In the document US 2004/0127586, a process is described making it possible to manufacture catalysts with improved hydrothermal stability by introducing stabilizers such as boron, cobalt and zirconium into their composition.

The document U.S. Pat. No. 6,262,132 B1 describes a method aimed at reducing the attrition of catalysts used in "slurry" type reactors and in other types of reactor capable of leading to losses of catalyst by fragmentation, abrasion etc. In this document, a catalyst support is disclosed containing a certain quantity of titanium making it possible to increase the catalyst's resistance to attrition.

As regards the effect of water, the degradation of catalysts by conversion of the active phase due to oxidation or to a conversion phenomenon in a less reducible species is often mentioned. But it is also known that the water produced by the Fischer-Tropsch reaction or also the intentional addition of water to the synthesis reactor makes it possible to increase the activity of a catalyst containing cobalt (J. Catal, 211, 2002, 422). The positive effect of water on the selectivity of the Fischer-Tropsch reaction is also reported. Thus the effect of water on catalysts used for the Fischer-Tropsch reaction is highly contentious, and explanations accounting for the different results are lacking (M E Dry, Stud Surf Sci Cata 152, 2004, p. 577-578).

The applicant discovered that by controlling the partial pressure of water in the Fischer-Tropsch synthesis reactor it was possible to limit the phenomenon of degradation of the catalyst and in particular that of its mechanical properties, which is crucial for a slurry or bubbling-bed type process where the moved catalyst is subjected to significant mechanical stresses. The process according to the invention also has the advantage, due to the greater mechanical stability of the catalyst over time, of facilitating the subsequent stage of separation of the products of the reaction and of the catalyst.

Another advantage is to limit the reduction in the performances of the catalyst by limiting its physico-chemical conversion and thus to maintain over time good catalytic performances in terms of productivity and selectivity.

SUMMARY OF THE INVENTION

The subject of the invention is an improved process for the synthesis of hydrocarbons from a synthesis gas type feedstock obtained, for example, from natural gas, coal and/or biomass in which said synthesis gas is brought into contact with a catalyst in a reactor under Fischer-Tropsch synthesis conditions and in which the partial pressure of water is controlled in order to keep it below a critical value.

It makes it possible to limit any phenomenon of mechanical degradation of the catalyst and thus allows high performance levels to be maintained, in particular in terms of yield of heavy products (C5+ hydrocarbons).

DETAILED DESCRIPTION

The invention relates to a process for the synthesis of hydrocarbons based on a synthesis gas type feedstock obtained, for example but not restrictively, from natural gas, coal and/or biomass, in which said synthesis gas is brought into contact with a catalyst in a reactor under Fischer-Tropsch synthesis conditions and in which the partial pressure of water is controlled in order to keep it below a critical value $ppH_2O_{limit}$ defined by the formula:

$$ppH_2O_{limit} = \exp(-7751/d_p \cdot T) \cdot P_s(T)$$

where

T is the reaction temperature in K, $d_p$ is the average diameter of the catalyst pores in nm, determined by nitrogen adsorption-desorption (BJH, Barrett, Joymer and Halenda method), $P_s(T)$ is the saturating water vapour pressure at temperature T, in bar.

The process according to the invention makes it possible to improve the operation of the Fischer-Tropsch synthesis reactor by limiting the phenomenon of degradation of the mechanical properties of the catalyst that is linked to the presence of water vapour in the synthesis reactor. By degradation is meant a physico-chemical conversion of the catalyst which involves a reduction in its mechanical properties and in particular its resistance to attrition.

For a person skilled in the art, it is crucial to limit any phenomenon of attrition, erosion, fragmentation or rupture of the catalyst inherent in the use of particles, in particular in reactors of "slurry" or bubbling-bed type but also of fixed-bed type.

The applicant discovered that by operating the Fischer-Tropsch synthesis reactor keeping the partial pressure of water below a limit value inside the latter it is possible to significantly limit the phenomenon of mechanical degradation of the catalyst and, consequently, to improve the operation. In fact, the lower production of fines during the operation of the reactor allows a saving in catalyst consumption but also an easier separation of the catalyst and the reaction products. Moreover, by keeping the partial pressure of water in the reactor below a certain threshold, the deactivation of the catalyst is also limited and thus productivity is maintained at a good level.

In the process according to the invention, the mechanical degradation of the catalyst is evaluated by measuring the evolution of the quantity of fines (% by volume) smaller than 10 microns, generated during a Fischer-Tropsch synthesis test. The measurement is carried out by means of a LS230® Coulter laser diffraction granulometer, using heptane as diluent.

The activity of the catalyst is evaluated on the basis of the degree of conversion of the reagents, conversion of CO for example, in a catalytic test carrying out the Fischer-Tropsch reaction under given conditions (P, T, hourly volume rate etc.).

The process according to the invention involves keeping the partial pressure of water in the synthesis reactor below the critical value defined by the formula:

$$ppH_2O_{limit} = \exp(-7751/d_p \cdot T) \cdot P_s(T)$$

where

T is the reaction temperature in K, $d_p$ is the average diameter of the catalyst pores in nm, determined by nitrogen adsorption-desorption (BJH method), $P_s(T)$ is the saturating water vapour pressure at temperature T, in bar.

Preferably, the partial pressure of water in the reactor is controlled and kept below the value $0.95 \cdot ppH_2O_{limit}$. More preferably, the latter is controlled and kept below the value $0.9 \cdot ppH_2O_{limit}$ and still more preferably below the value $0.8 \cdot ppH_2O_{limit}$.

The partial pressure of water in the reactor is preferably strictly less than the partial pressure of hydrogen, more preferably the partial pressure of water in the reactor is less than or equal to 0.8 times the partial pressure of hydrogen and still more preferably less than or equal to 0.7 times the partial pressure of hydrogen. In this way, the performance levels of the process are optimized, in particular in terms of selectivity in respect of the heaviest hydrocarbons and catalyst stability.

The temperature T (in Kelvin) is that of the reaction zone (set in the reactor). When the reactor comprises several reaction zones operating at different temperatures, the partial pressure of water is controlled out zone by zone and is generally comprised between 100 and 500° C., preferably between 180 and 300° C.

The average diameter of the pores $d_p$ is determined on the basis of the BJH (Barrett, Joymer and Halenda) method of nitrogen adsorption and desorption at 77 K. It corresponds to the value of the ratio 4V/A, V being the desorbed BJH volume and A the area of the BJH pores on desorption.

For the catalysts used in the process according to the invention, the average diameter is comprised between 0.1 and 100 nm, preferably between 1 and 50 nm (1 nm=$10^{-9}$ m).

The saturating water vapour pressure is given by the thermodynamic tables which are well known to a person skilled in the art and is expressed in bars (1 bar=$10^5$ Pa).

As regards the partial pressure of water, this is determined according to the definition of a person skilled in the art, on the basis of the molar composition of the gas phase contained in the reaction enclosure and the total pressure: $pp_{H2O} = (x_{H2O}/\Sigma x_i) \cdot P_T$ where $x_{H2O}$ is the molar fraction of water $x_i$ is the molar fraction of compound i $P_T$ is the total pressure of the reactor.

Generally, the molar composition of the gas phase is determined by GPC (gas-phase chromatography) analysis of a sample taken at the reactor outlet. Any other means known to a person skilled in the art can be used to determine the composition of the gas phase. For example, it can also be obtained by calculation on the basis of basic data of the Fischer-Tropsch reaction: $H_2/CO$ ratio, level of conversion and distribution of the products.

By way of illustration, Table 1 below shows the values of critical partial pressure of water for different temperature values and average pore diameters for the catalyst.

TABLE 1 values of $ppH_2O_{limit}$ (in bars) as a function of the temperature and the average diameter of the pores of the catalyst

| T (° C.) | T (K) | average pore diameter 10 nm | average pore diameter 9 nm | average pore diameter 8 nm |
| --- | --- | --- | --- | --- |
| 210 | 483 | 3.91 | 3.27 | 2.62 |
| 215 | 488 | 4.37 | 3.66 | 2.94 |
| 220 | 493 | 4.87 | 4.09 | 3.28 |
| 225 | 498 | 5.41 | 4.55 | 3.67 |
| 230 | 503 | 6.00 | 5.05 | 4.08 |

The process according to the invention is carried out in a Fischer-Tropsch synthesis reactor, either fixed-bed (reactor with a fixed-bed catalyst or also with one or more catalyst beds in the same reactor), or preferably in a three-phase reactor ("slurry" method) comprising the catalyst in suspension in an essentially inert liquid phase and the reactive gas phase (synthesis gas).

The synthesis gas used for the reaction can be obtained via the conversion of natural gas, coal or biomass by processes such as steam reforming or partial oxidation, or also via the decomposition of methanol, or on the basis of any other process known to a person skilled in the art. Any feedstock comprising at least hydrogen and carbon monoxide can thus be suitable. Preferably, the synthesis gas used in the Fischer-Tropsch synthesis has an $H_2/CO$ molar ratio comprised between 1:2 and 5:1, more preferably between 1.2:2 and 3:1 and still more preferably between 1.5:1 and 2.6:1.

The synthesis gas generally also comprises a small proportion of carbon dioxide ($CO_2$), preferably less than 15% by volume, or even less than 10% by volume.

Fischer-Tropsch synthesis is generally carried out under a pressure comprised between 0.1 MPa and 15 MPa, preferably comprised between 1 MPa and 10 MPa and still more preferably comprised between 1.5 MPa and 5 MPa. The hourly volume rate of the synthesis gas is generally comprised between 100 and 20,000 $h^{-1}$ (volume of synthesis gas per volume of catalyst per hour), preferably between 400 and 10,000 $h^{-1}$.

Any catalyst suitable for the Fischer-Tropsch synthesis known to a person skilled in the art is suitable for the process according to the invention, in particular those mentioned in the "Prior Art" section of this application. A supported catalyst is preferably used, the support preferably being chosen from the oxides of the group formed by alumina, silica, zirconium, titanium oxide, magnesium oxide or their mixtures. Preferably, the catalyst support contains the element Al.

Very preferably, the catalyst used according to the invention is a catalyst comprising an alumina-based support and containing cobalt.

Different promoters known to a person skilled in the art can also be added, in particular those selected from the following elements: rhenium, ruthenium, molybdenum, tungsten, chromium. It is also possible to add at least one alkali or alkaline earth to the formulation of the catalyst.

According to the process of the invention, the partial pressure of water in the reactor is controlled by performing the following actions:

a) determination of the value $ppH_2O_{limit}$ under the reaction conditions, taking account of the temperature of the reaction zone and properties of the catalyst used in the Fischer-Tropsch synthesis stage (average pore diameter);

b) measurement of the partial pressure of water vapour, comparison with the value $ppH_2O_{limit}$ and any necessary adjustment of said partial pressure in the Fischer-Tropsch synthesis reactor ($ppH_2O_{react}$) using at least one means selected from the following means, to verify the condition $ppH_2O_{react} < ppH_2O_{limit}$:

This adjustment can be carried out using any means known to a person skilled in the art and in particular a means selected from the following means:

1. reduction of the total pressure, 2. introduction of an inert diluent into the feedstock of the Fischer-Tropsch reactor, 3. increase in the feedstock flow rate, 4. increase in the recycling rate in the case where the reaction section or the reactor is equipped with means of recycling unconverted gas, 5. continuous elimination of all or part of the water formed by the reaction, 6. reduction in the operating temperature.

In more detailed manner, this adjustment can be carried out using at least one means selected from the following means:

1. The increase in the flow rate of fresh feedstock (synthesis gas) is one of the preferred means. It makes it possible to reduce the time of contact of the feedstock with the catalyst, and thus to reduce the rate of conversion of CO per pass, and consequently to reduce the partial pressure of water. Moreover, this action has the advantage of increasing the productivity of the unit without degrading the intrinsic selectivity of the Fischer-Tropsch reaction.

2. The increase in the rate of recycling of unconverted gas, in the case where the reaction section or the reactor is equipped with internal recycling means, is among the preferred action means. It produces a reduction in the conversion rate per pass, and consequently a reduction in the partial pressure of water in the reaction section.

3. The reduction in temperature leads to a slowing down of the reaction kinetics according to Arrhenius's law. Consequently the reduction in temperature causes a reduction in the CO conversion rate and thus a reduction in the partial pressure of water. This action has the drawback of also reducing the productivity of the process.

4. The reduction in total pressure has a direct impact on the partial pressures and thus on the partial pressure of water. It also has an impact on the kinetics of the reaction, which also leads to a reduction in the partial pressure of water by reducing the degree of conversion. However, this means has a negative impact on the production of the process. It is also more difficult to carry out.

5. The introduction of an inert diluent, nitrogen or methane for example, at the inlet to the reaction section, leads to less favourable Fischer-Tropsch synthesis kinetic conditions and to a reduction in the partial pressure of water in the reactor. However, this option is not generally the preferred option, as it is difficult to carry out on an industrial scale (problem of availability of the inert diluent for example).

6. Another method involves continuously eliminating the water formed by the reaction by means of a separation device installed in the reaction zone or in a recycling loop. Such a separation can for example be carried out by means of a flask making it possible to separate the aqueous phase from the organic phase in a recycling loop or by means of a membrane implanted in this loop or in the reactor.

The choice of one of these means essentially depends on the means available at the industrial unit and the operating conditions when the choice is made.

The preferred means used in stage b) of any adjustment of the partial water vapour pressure in the reactor are generally as follows:
1. Increase in the feedstock flow rate,
2. Increase in the rate of recycling of unconverted gas, in the case where the reaction section or the reactor is equipped with internal recycling means,
3. Reduction in the temperature.

Very preferably, means 1 or means 2 is used.

The method described also makes it possible to maximize the stability of the catalyst in the Fischer-Tropsch process. It makes it possible in particular to limit the phenomenon of mechanical degradation of the catalyst and to maintain its activity. The scope of the invention can be better understood in the light of Example 1 below, which however is not limitative in character.

EXAMPLE 1

The Fischer-Tropsch synthesis reaction is carried out in a device comprising a 1-liter reactor with a diameter of 7.6 cm (continuous-stirred tank reactor, CSTR) with maintained pressure and temperature and able to be operated continuously. The reactor is supplied with a synthesis gas having an $H_2/CO$ ratio equal to 2. The feedstock (synthesis gas) flow rate is controlled and can also be adjusted in order to increase or reduce the reaction time. The Fischer-Tropsch synthesis is carried out at 230° C. in the presence of a cobalt-based catalyst supported on gamma alumina ($Co/Al_2O_3$=12% by weight), reduced beforehand. Said catalyst is suspended in 800 ml of octadecane and has an average grain size of 55 microns (μm) with 1.3% by volume of particles smaller than 10 microns and 0.7% by volume of particles larger than 150 microns.

The catalytic performances are determined on the basis of the analysis of the gaseous effluent and measurement of its flow rate.

The resistance or mechanical degradation of the catalyst is evaluated under reaction conditions, under Fischer-Tropsch synthesis conditions by measuring the attrition of the solid.

The attrition of the catalyst is evaluated by determination of the particle-size distribution by laser granulometry before and at the end of the test. The measurements, the results of which are shown below, are carried out using a LS230® laser diffraction granulometer marketed by Coulter, using heptane as diluent and applying ultrasound for as long as necessary for the measurement to be stabilized (generally 1 to 15 minutes).

The activity of the catalyst is evaluated on the basis of the degree of conversion of the reagents, conversion of CO for example, in a catalytic test carrying out the Fischer-Tropsch reaction under given conditions (P, T, hourly volume rate etc.).

Several experiments are carried out under different synthesis gas supply conditions:

case 1: the reaction is carried out at 230° C. under 30 bar and the feedstock flow rate is 100 NI/h (hourly volume rate: 2000 $h^{-1}$)

case 2: the reaction is carried out at 230° C. under 30 bar and the feedstock flow rate is 220 NI/h (hourly volume rate: 4400 $h^{-1}$)

case 3: the reaction is carried out at 220° C. under 30 bar and the feedstock flow rate is 124 NI/h (hourly volume rate: 2480 $h^{-1}$)

case 4: the reaction is carried out at 230° C. under 30 bar and the feedstock flow rate is 220 NI/h (hourly volume rate: 4400 $h^{-1}$). The catalyst has a smaller diameter than in cases 1 to 3 (8 nm instead of 10 nm).

|  | case 1 | case 2 | case 3 | case 4 |
|---|---|---|---|---|
| T (° C.) | 230 | 230 | 220 | 230 |
| P (bar) | 30 | 30 | 30 | 30 |
| Average diameter of the catalyst pores (nm) | 10 | 10 | 10 | 8 |
| Feedstock flow rate (NI/h) | 100 | 220 | 124 | 220 |
| Initial CO conversion | 73.3% | 42.4% | 42.2% | 42.4% |
| Initial $ppH_2O_{react}$ (bar) | 12.5 | 5.6 | 5.6 | 5.6 |
| Average $ppH_2O_{react}$ during the test (bar) | 8.1 | 5.5 | 5.1 | 5.0 |
| $PpH_2O_{limit}$ (bar) | 6 | 6 | 4.87 | 4.08 |
| Initial $ppH_2$ (bar) | 7.9 | 14.7 | 14.8 | 14.7 |
| Residual conversion after 850 h (%) | 49% | 98% | 88% | 85% |
| Catalyst grain size (% by vol. <10 micron) |  |  |  |  |
| initial | 1.3 | 1.3 | 1.3 | 1.3 |
| after the test | 13.1 | 4.1 | 7.8 | 8.8 |

The granulometry results evaluating the quantity of fines (smaller than 10 microns) indicate that the catalysts which are used in the reactor under conditions such that $ppH_2O_{react}$ remains below $ppH_2O_{limit}$ show a better mechanical resistance (attrition resistance). It is thus observed that the formation of fines (particles smaller than 10 micron) is clearly greater in cases 1, 3 and 4.

Case 2 (according to the invention) illustrates that, concomitantly, the activity of the catalyst remains more stable when the partial pressure of water is below the limit value according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 08/00.056, filed Jan. 4, 2008.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the synthesis of hydrocarbons based on a synthesis gas type feedstock, said process comprising:
bringing said synthesis gas into contact with a catalyst in a reactor under Fischer-Tropsch conditions and controlling the partial pressure of water in said reactor keep the partial pressure of water below a critical value $ppH_2O$-$_{limit}$ defined by the formula:

$$ppH_2O_{limit} = \exp(-7751/d_p T) \cdot P_s(T)$$

where T is the reaction temperature in K,
$d_p$ is the average diameter of the catalyst pores in nm, determined by nitrogen adsorption-desorption (BJH method), and $P_s(T)$ is the saturating water vapour pressure at temperature T, in bar;

wherein said partial pressure of water is controlled by implementing the following actions:

a) determining the value $ppH_2O_{limit}$ under the reaction conditions, taking into account the temperature of the reaction zone and the average pore diameter of the catalyst used in the Fischer-Tropsch synthesis stage;

b) measuring the partial pressure of water vapor, comparing the measured partial pressure of water vapor with the value $ppH_2O_{limit}$, and making any necessary adjustment of said partial pressure in the Fischer-Tropsch synthesis reactor ($ppH_2O_{react}$) by using at least one means selected from the following means, to verify the condition $ppH_2O_{react} < ppH_2O_{limit}$:

increasing the feedstock flow rate, increasing the rate of recycling of unconverted gas in the case where the reaction section or the reactor is equipped with means of recycling unconverted gas, reducing the operating temperature, reducing the total pressure, introducing an inert diluent into the feedstock of the Fischer-Tropsch reactor, and continuously eliminating all or part of the water formed by the reaction.

2. A process according to claim 1, wherein the partial pressure of water in the reactor is controlled and kept below the value of $0.95.ppH_2O_{limit}$.

3. A process according to claim 1, wherein the partial pressure of water in the reactor is controlled and kept below the value of $0.8.ppH_2O_{limit}$.

4. A process according to claim 1, wherein said selected means is chosen from the following means:

increasing the feedstock flow rate, increasing the rate of recycling of unconverted gas, in the case where the reaction section or the reactor is equipped with internal recycling means, and reducing the temperature.

5. A process according to claim 1, wherein said catalyst comprises a support.

6. A process according to claim 5, wherein the catalyst support contains the element Al.

7. A process according to claim 1, wherein said catalyst comprises an alumina-based support and contains cobalt.

8. A process according to claim 1, wherein said catalyst has an average pore diameter between 0.1 and 100 nm.

9. A process according to claim 1, wherein said catalyst has an average pore diameter between 1 and 50 nm.

10. A process according to claim 1, wherein said partial pressure of water in the reactor is strictly less than the partial pressure of hydrogen.

11. A process according to claim 10, wherein said partial pressure of water in the reactor is less than or equal to 0.8 times the partial pressure of hydrogen.

12. A process according to claim 10, wherein said partial pressure of water in the reactor is less than 0.7 times the partial pressure of hydrogen.

13. A process according to claim 1, wherein the Fischer-Tropsch synthesis reactor is operated under a total pressure between 0.1 and 15 MPa, at a temperature between 100 and 500° C., and with an hourly volume rate of the synthesis gas between 100 and 20,000 $h^{-1}$.

14. A process according to claim 1, wherein the partial pressure of water in the reactor is controlled and kept below the value of $0.9.ppH_2O_{limit}$.

15. A process according to claim 1, wherein the synthesis gas used in the Fischer-Tropsch synthesis has an $H_2/CO$ molar ratio between 1:2 and 5:1.

16. A process according to claim 1, wherein the synthesis gas used in the Fischer-Tropsch synthesis has an $H_2/CO$ molar ratio between 1.2:2 and 3:1.

17. A process according to claim 1, wherein the synthesis gas used in the Fischer-Tropsch synthesis has an $H_2/CO$ molar ratio between 1.5:1 and 2.6:1.

18. A process according to claim 1, wherein the synthesis gas contains less than 15% by volume carbon dioxide.

19. A process according to claim 1, wherein the synthesis gas contains less than 10% by volume carbon dioxide.

20. A process according to claim 13, wherein the Fischer-Tropsch synthesis reactor is operated under a total pressure between 1 and 10 MPa, and with an hourly volume rate of the synthesis gas between 400 and 10,000 $h^{-1}$.

* * * * *